United States Patent [19]

Aoki et al.

[11] Patent Number: 4,972,569

[45] Date of Patent: Nov. 27, 1990

[54] METHOD FOR ROTATINGLY TRANSFERRING HOLLOW CYLINDRICAL ARTICLES

[75] Inventors: Motohisa Aoki, Tokyo; Ryuuji Nakayama, Sagamihara; Tadashi Umehara, Yokohama; Jiro Taguti, Machida, all of Japan

[73] Assignee: Mitsubishi Kasei Corporation, Tokyo, Japan

[21] Appl. No.: 415,344

[22] PCT Filed: Nov. 30, 1988

[86] PCT No.: PCT/JP88/01209

§ 371 Date: Aug. 14, 1989

§ 102(e) Date: Aug. 14, 1989

[87] PCT Pub. No.: WO89/05198

PCT Pub. Date: Jun. 15, 1989

[30] Foreign Application Priority Data

Nov. 30, 1987 [JP] Japan ................................. 62-299879

[51] Int. Cl.[5] .......................... B05D 1/04; B05D 1/40; B23P 11/00

[52] U.S. Cl. ........................................ 29/429; 29/430; 29/527.4; 118/320; 118/630; 118/DIG. 11; 198/373; 427/33; 427/425

[58] Field of Search .................. 427/33, 425; 118/320, 118/630, DIG. 11; 29/429, 527.4, 430; 198/373

[56] References Cited

U.S. PATENT DOCUMENTS 3,157,549 11/1964 Morain ................... 118/DIG. 11 X
3,743,124 7/1973 Jarvis ............................ 118/320 X
3,859,118 1/1975 Snyder ........................... 427/425 X
3,904,346 9/1975 Shaw et al. ...................... 118/320 X

FOREIGN PATENT DOCUMENTS 62-61672 3/1987 Japan .

*Primary Examiner*—Evan Lawrence
*Attorney, Agent, or Firm*—Oblon, Spivak, McCelland, Maier & Neustadt

[57] ABSTRACT

A method of rotating and transferring hollow cylindrical workpieces without causing the outer surfaces of such workpieces to come into contact with each other and a non-contact method of coating hollow cylindrical workpieces which are rotated and transferred, characterized in that flanges having bores in the central portions thereof are fitted over both end portions of each hollow cylindrical workpiece, a shaft being inserted through the bores in these flanges and supported horizontally together with the workpiece at each end on and rotated by a plurality of paired vertically movable rollers which are spaced by a distance not shorter than the length of the workpiece, a pusher for moving the workpiece being provided on a shaft, a coating mechanism being provided at an intermediate portion of the shaft in order to coat the workpiece with a material, a plurality of flanged workpieces being moved by the pusher toward a discharge end of the shaft and removed therefrom in order. A plurality of workpieces can be fitted around the shaft continuously without causing the outer surfaces of the workpieces to come into contact with each other as the shaft is supported and rotated horizontally, and they can thereafter be removed from the shaft at the discharge end thereof. The workpieces can also be moved smoothly on the shaft as the rotation of the shaft is transmitted accurately to the workpieces.

10 Claims, 4 Drawing Sheets

METHOD FOR ROTATINGLY TRANSFERRING HOLLOW CYLINDRICAL ARTICLES

TECHNICAL FIELD

This invention relates to a method for rotatingly tranferring a hollow cylindrical article while maintaining its outer surface without any contact and an apparatus for practicing the method, and more particularly to a method for coating a hollow cylindrical article and an apparatus therefor which are advantageously applied to spray coating , jet washing or drying an electrophotographic photocondutor drum or a belt, or the like.

BACKGROUND ART

Electrostatic spray coating a cylindrical article such as, for example, a drum has been conventionally carried out by rotating drums one by one while holding them vertical, as disclosed in Japanese Patent Application Lain-Open publication No. 61672/1987.

Unfortunately, with such conventional coating, when spraying the liquid under conditions evenly forming droplets on to the drum to a degree sufficient to form a smooth film, the droplets flow down in the axial direction of the drum, resulting in the thickness of the film in the axial direction of the drum being non-constant. Also, rotation of the drums while holding them horizontal, in addition to that while holding them vertical, when electrostatic spray coating the drums one by one, results in a potential gradient which increases at the end of the drum, leading to an increase in the amount of liquid applied to the end, resulting in the thickness of the film formed on the drum being uneven. In order to avoid such a problem, it is required to arrange dummy drums on both sides of the drum to be coated. However, this substantially reduces the efficienty in coating the liquid on the drum. Furthermore, coating the drums one by one requires a drum holding and rotating mechanism for each drum, leading to not only an increase in cost but also to a failure in coating the drum symmetrically about its center in its axial direction, so causig a deterioration of the uniform spray coating on the drum. Also, this causes the drum holding and rotating mechanism to be coated likewise, resulting in a failure in the stable operation of the mechanism.

Moreover, in spray coating, it is desirable to spray liquid from a spray head continuously. Intermittent spraying of the liquid causes the liquid to dry in the spray head, leading to a failure in coating because the film formed by dried spray in the spray head is partially dissolved during a subsequent coating operation, producing foreign matter, thus, continuous coating is desired. However, conventional continuous coating leads to wastage of the liquid, resulting in an increase in cost.

SUMMARY OF THE INVENTION

The present invention has been made in view of the foregoing disadvantage.

Accordingly, it is an object of the present invention to provide a method for rotatingly transferring a hollow cylindrical article which is capable of being advantageously applied to coating or surface treating the article, and an apparatus for practicing such a method.

In the present invention a flange which is formed at its central portion with a hole is fitted to each of the two ends of a hollow cylindrical workpiece and a shaft is inserted through the hole in the flange. Then, the shaft is horizontally supported and rotated by means of a pair of vertically movable rotating rollers arranged at least two positions at each of the two ends of the shaft in such a way that they are spaced from each other by an interval equal to or greater than the length of one workpiece. The shaft is configured to cause the workpiece to be rotated coaxially in relation to the hole in the flange and is formed at that portion thereof against which each of the rotating rollers abuts into a circular shape sufficient in section to allow it to pass the hole of the flange. A pusher is arranged to transfer the workpiece on the shaft. Also, a plurality of flanged workpieces are successively inserted through the hole in the flange from one end of the shaft horizontally supported and rotated about its axis by means of the rotating rollers to join the workpieces together through both their ends in succession. Subsequently, the workpieces are transferred in the direction of delivery of the workpieces by means of the pusher while being rotated coaxially with the shaft, resulting in their being guided to the other end of the shaft, and then the workpiece are successively removed from the shaft.

The shaft is supported and rotated by means of at least two rollers arranged on the insertion side of the shaft and at least two such rollers arranged on the removal side of the shaft, and each of the rollers is adapted to carry out support and nonsupport of the shaft depending on its contact with an separation from the shaft, respectively. The flanged workpieces pushed by the pusher are passed on a portion of the shaft supported by each of the rollers, when that roller does not support the shaft. Then, they are delivered to the next pusher.

The pusher includes three or more than three pushers containing a pusher (P1) for delivering a workpiece from a short loading shaft to a main shaft, a pusher (P2) for transferring the workpiece on the shaft at a constant speed and a pusher (P3) for removing the workpiece from the shaft. The pushers (P1) and (P3) are actuated at a speed greater than the pusher (P2) to carry out insertion and/or removal of a workpiece during the transferring of workpieces at a constant speed.

BRIEF DESCRIPTION OF THE DRAWINGS

The drawings illustratively show a manner of practicing the present invention in which:

FIGS. 1 to 4 show an embodiment of an apparatus for practicing a method for the present invention which includes a shaft having two support rollers provided at each of its two ends, and a way of controlling the apparatus, wherein FIG. 1 is plane view of the apparatus, FIGS. 5 to 8 show another embodiment of an apparatus for practicing a method of the present invention which includes a shaft having three support rollers provided at each of its two ends and a way of controlling the apparatus, wherein FIG. 5 is a plane view of the apparatus.

DETAILED DESCRIPTION OF THE PREFERRED EMBODIMENS

Figure 1:
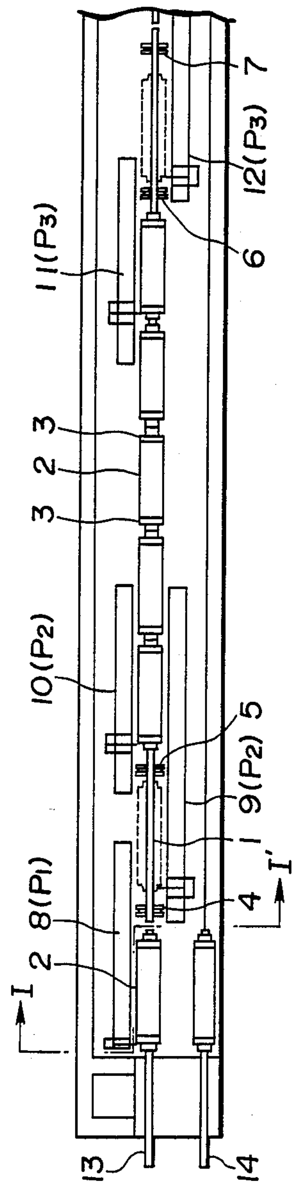
Figure 2A:
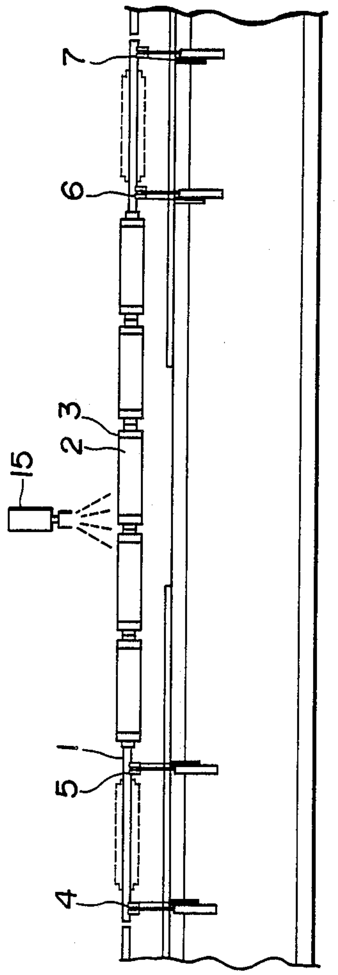
FIG. 2(A) is a front elevation at a part of the apparatus.
Figure 2B:
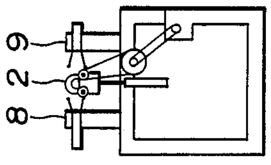
FIG. 2(B) is a sectional view taken along line I—I' of FIG. 1, and FIGS. 3 and 4 are each a time chart showing the way in which each support roller of the apparatus is controlled.

Now, an embodiment of an apparatus for practicing the method of the present invention will be described in detail with reference to the drawings. Reference numeral 1 designates a shaft, 2 designates a workpiece, 3 designates flange, 4, 5, 6 and 7 each designate a supporting and revolving roller comprising a pair of roller members, 8(P1), 9, 10(P2), 11 and 12(P3) each designate a pusher, 13 and 14 each designate a loading shaft, and 15 designates a spray head.

The way in which liquid is coated on the workpiece is not limited to spraying. Any other suitable ways as well as spraying may be employed as long as they can apply liquid to the workpiece while it is rotated. For example, multihea coating, application by a curtain coater, blade coating, undersurface dip coating and the like may be suitably employed for this purpose.

The application of the method of the present invention to an electrostatic spray coating technique, which would other wise have the disadvantage of causing the liquid to dry in a spray head due to interruption of spraying, eliminates wastage of the liquid of the coating, because the present invention can continuously feed workpieces to the shaft, thus preventing any interruption.

The shaft acts to guide the workpiece linearly and transmit it rotationally. Accordingly, it is desirable to form the shaft as a non-circular section like a spline shaft and to form the holes in the flanges with a corresponding shape in order to rotate the workpiece against friction by the pusher. It is a matter of course that the shaft is not limited to such a specific shape when the flange hole and/or the shaft are provided with a rough surface so as to rotate the workpiece by means of only resistance to slip between them.

The loading shafts 13 and 14 are arranged above a linear way on a frame so as to be on the same level and extend in the same direction as the shaft 1, and are laterally movable by means of a pneumatic cylinder (not shown).

First, workpieces each having flanges on each end are set on the loading shafts 13 and 14, respectively. In this case, each of the workpieces is an aluminum drum on which a photosensitive agent is to be coated. The automatic arrangement of the workpieces is readily carried out by a robot. The loading shafts 13 and 14 are rotated into synchronism with the shaft 1 which is itself rotated at a constant speed by a servo motor (not shown). The shaft 1 is supporting and rotating rollers (hereinafter referred to as "support roller") 5 and 7. Between the support rollers 5 and 6 are five workpieces, set as shown in the drawings, transferred to the part of the shaft 1 beyond the support roller 4 by means of the pusher 8. At this time, the pusher 11 acts to separate the rightmost drum from the drum group and moves it beyond the support roller 6. When a workpiece is transferred beyond the support rollers 4 and 6, the roller 4 and 6 are moved upwards to support the shaft 1 and simultaneously the support rollers 5 and 7 are moved downwards. In the illustrated embodiment, the support rollers 4 and 6 and the support rollers 5 and 7 each form a pair to be vertically moved together.

The pusher 9 pushes the flange on the left side of the workpiece to cause it to reach the workpiece moved at a constant velocity by the pusher 10, and moves it at the same velocity, resulting in both workpieces being joined without any impact. After the joining, the pusher 10 is separated from the workpiece, stopped and then moved rapidly in the opposite direction, in order to stand by, near the support roller 5. When the pusher 9 pushes the work group at a constant speed to transfer its left end beyond the support roller 5, the pusher 10 standing by is moved forward at a constant velocity to push, in parallel with the pusher 9, the flange pushed by the pusher 9. Thus, the pusher 9 transfers the work to the pusher 10. Then, the pusher 9 is stopped and rapidly moved in the opposite direction, in order to stand by, near the support roller 4. At this time, the support roller 5 is lifted and the support roller 4 is lowered, so that it is ready for insertion of the next workpiece. When the subsequent cycle starts, the pneumatic cylinder (not shown) is actuated to cause the pusher 8 to push a workpiece on the side of the loading shaft 14 to move it beyond the support roller 4, and then the above-described procedure is repeated.

During the above-described operation, on the delivery side of the apparatus, the pusher 12 feeds the workpiece moved beyond the support roller 6 to a transfer mechanism arranged on the unloading side of the apparatus and equipped with shafts corresponding to the shafts 13 and 14, while the support roller 7 is lowered. The pusher 11 is returned to the original position in order to stand by. When the workpiece is moved beyond the support roller 7, the support roller 7 is lifted and the support roller 6 is lowered. Thus, the unloading side is ready for the subsequent cycle.

Figure 3:
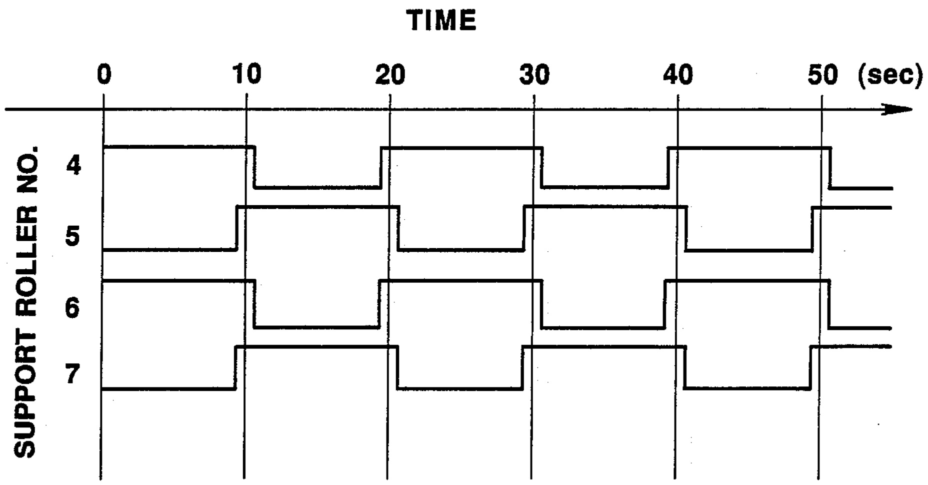

The above-described movement of each of the support rollers is generally shown in FIG. 3. As can be seen from FIG. 3, the pushers are each always controlled so as to permit the workpiece to pass above the support roller located at the lowered position.

Figure 4:
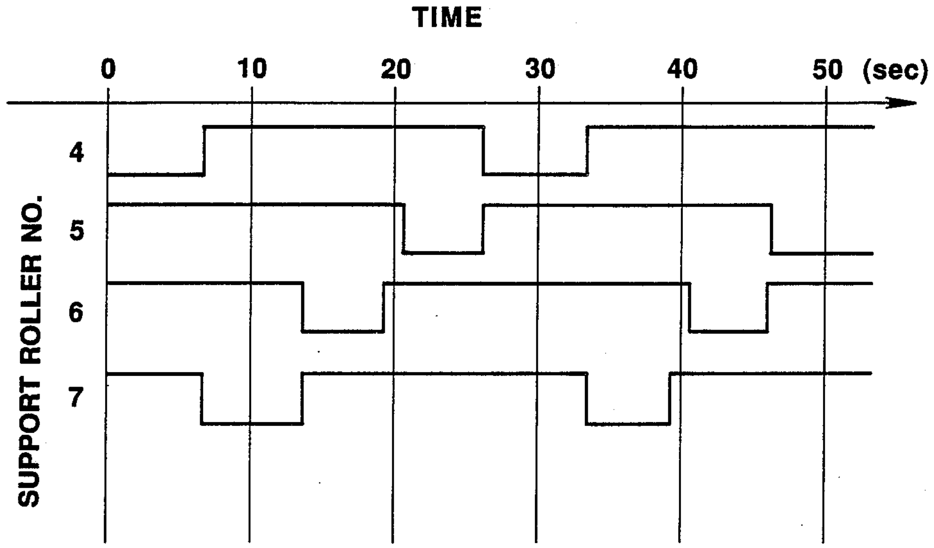

It might be thought that supporting the shaft at two points as described above often causes it to be deflected, depending on the length and rigidity of the shaft. This is effectively prevented by controlling the movement of each of support rollers as shown in FIG. 4 because the shaft is constantly supported at three or more points. In this instance, the workpiece is permitted to pass above the support roller only when the support roller is located at the lowered position. Accordingly, it is required to move the pusher at an increased speed because the transfer of the workpiece must be completed in a substantially reduced time as indicated in FIG. 4 in order to support the shaft constantly at three or more points without deteriorating the production efficiency or reducing the number of workpieces fed to the shaft per unit time.

Figure 5:
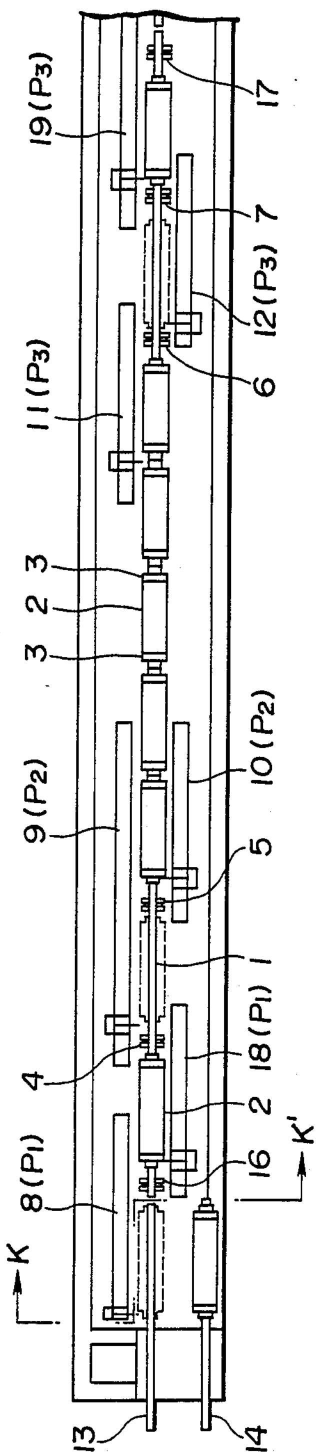
Figure 6A:
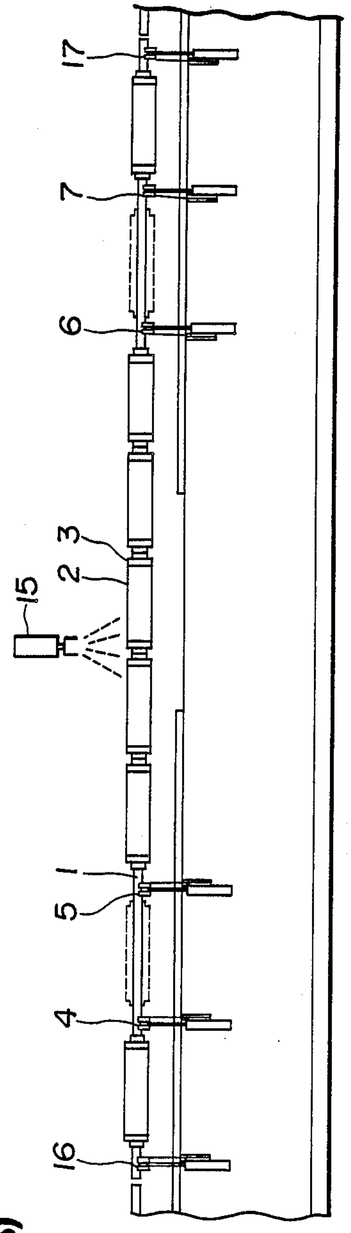
FIG. 6(A) is a front elevation of a part of the apparatus.
Figure 6B:
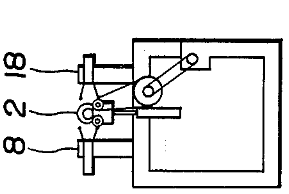
FIG. 6(B) is a sectional view taken along line K—K' in FIG. 5, and FIGS. 7 and 8 are each a time chart showing the way in which each support roller of the apparatus is controlled.
Figure 7:
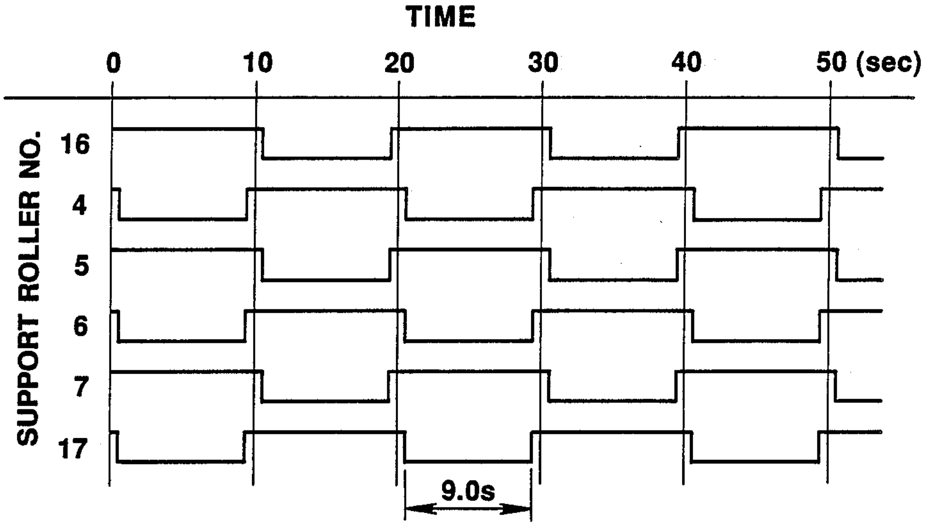
Figure 8:
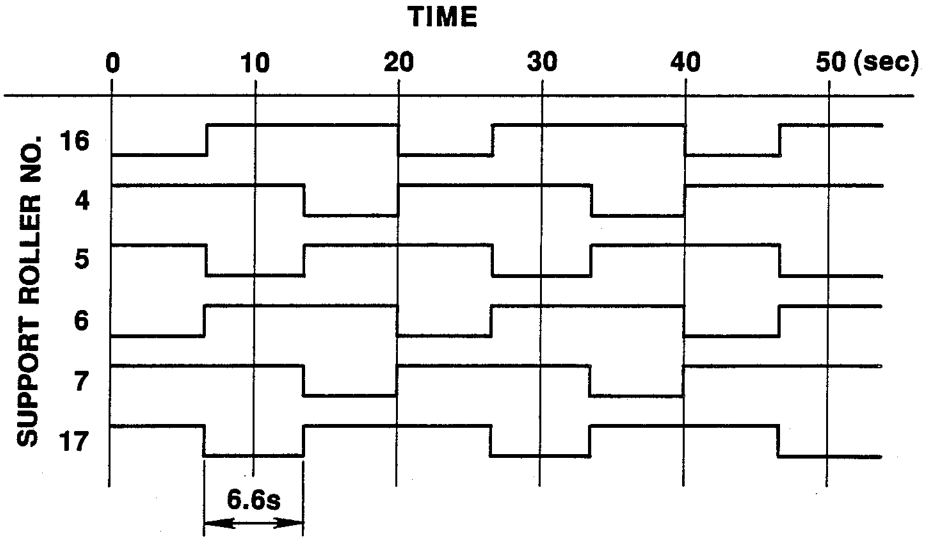

However, this is preferably solved by extending both ends of the shaft, providing the extended ends of the shaft with support rollers 16 and 17, respectively, and arranging additional pushers 18 and 19 corresponding to the rollers 16 and 17 as shown in FIGS. 5 and 6, and by controlling each of the rollers in the manner shown in FIG. 7 since this construction permits the shaft to always be supported at three or more points without changing the speed of movement of the pusher. Also, the movement of each of the support rollers shown in FIG. 8 permits the shaft to be supported constantly at four or more points.

The number of support rollers provided at both ends of the shaft may be four or more as required. However, it is merely required to control the movement of each of the pushers irrespective of the number of support rollers and the movement of the support rollers so that the workpiece may pass above the support roller located at the lowered position.

In FIGS. 3, 4, 7 and 8, the location of the line corresponding to each of the support rollers at a higher position indicates that the support roller supports the shaft at the raised position and the location of the line at the lower position indicates that the support roller is located at the lowered position and is free from contact with the shaft.

The above-described operation is incorporated in a sequencer and passed to the subsequence operation in dependence upon positional data received by the sequencer.

Now, the present invention will be described hereinafter with reference to examples.

EXAMPLE 1

An organic electrophotographic photoconductor (OPC) drum was manufactured using the apparatus shown in the drawings.

Each of workpieces used was an aluminum drum having dimensions of 78.5 mm in inner diameter, 80 mm in outer diameter and 350 mm in length, and a clearance of 40 to 70 μm was defined between the workpiece and a flange. The support rollers 4 and 5 were arranged at an interval of 500 mm and the support roller 6 and 7 were arranged at an interval of 500 mm, and the interval between the support roller 4 and 7 was set to be 2000 mm. The deflection of the shaft while mounting the workpieces on the shaft was about 5 mm. The rotating speed of the shaft and the feed rate of the workpiece were set at 100 rpm and 17.5 mm/sec, respectively.

Also, at a substantially central region between the support rollers 5 and 6 was arranged a spray head 15 (Minibell Type manufactured by Nippon Runsburg) spaced by 150 mm from the surface of the workpiece. Coating the drum was carried out under conditions of rotating the cup (a bowl-like rotary element and parts of the spray head) at a speed of 1500 rpm,m applying a voltage of −60000 V to the cup and feeding a charge transport layer solution having a solid content of 16 wt % at a rate of 400 ml/min. The coating efficiency was 94% and the thickness of the film formed and dried on the drum was 22.6±0.5 μm.

EXAMPLE 2

In the manufacture of an OPC drum using the apparatus shown in the drawings, both a way of separately coating liquid for a charge generating layer and liquid for a charge transport layer to form a laminate of the two layers, and a way of coating mixture of a photosensitive agent for the charge generating layer and a photosensitive material for the charge transport layer to form a single layer, were carried out.

(1) Laminate Type

Liquid for the charge generating layer and liquid for the charge transport layer were prepared according to Table 1 and Table 2, respectively.

Common Conditions:

- Diameter of cup: 73 mm, Rotating speed of cup: 15,000 rpm, Voltage applied to cup: −60 kV, Pressure applied to shaping air: 1 kg/cm$^2$,
- Article to be coated: aluminum drum of 80 mm (diameter)×350 mm (length) ×1 mm (thickness)
- Rotating speed: 200 rpm during coating and 60 rpm during drying:
- Distance between cup and centre of aluminum drum: 170 mm In carrying out the spray coating on the OPC drum, an electrostatic coating machine is preferably used which is so constructed that a section for spraying coated liquid is formed into a bowl-like shape and rotated at a high speed about its axis to atomize the coating liquid supplied to the bowl. Such electrostatic coating machines includes, for example, an ultra-high speed bell-type electrostatic coating machine RAB-500 manufactured by Devilbis (Japan) Co., Ltd., Trinicobell 9-62 Type 50φ, 60φ manufactured by Trinity Industrial Corp., Grooved Minibell+J3ST 73 mmφ Airmotor, and the like.

The bowl has a diameter of 40 to 100 mm, its rotating speed is from 1,000 to 50,000 rpm and preferably 5,000 to 30,000 rpm. The voltage applied thereto is from −10 to −100 kV.

The coating of the charge generating layer liquid was carried out at a liquid feed rate of 44 ml/min and at a work transfer speed of 110 mm/sec. The cup passed in front of the drum in about 3 seconds.

The thickness of the dried film was 0.5 μm. Dried films of 0.4 μm, 0.5 μm and 0. 6 μm in thickness formed while controlling the transfer speed were clearly different in hue from one another and a film thickness of 0.1 μm was visually distinguished. The film of 0.5 μm in thickness had a substantially uniform hue and the unevenness of the film thickness was within 0.1 μm.

The coating of the conductive layer liquid was carried out at a liquid feed rate of 200 ml/min and at a workpiece transfer speed of 56 mm/sec. The cup passed in front of the drum in about 6 seconds.

The thickness of the dried coated film was estimated to be 20 μm. The thickness of the film in each of the axial and circumferential directions of the workpiece was measured using an eddy-current instrument for measuring thickness. All the measured values were within the range of 20±0.5 μm.

After the formation of both layer liquids, the electrical characteristics were measured and the picturing characteristics were evaluated. The results were substantially the same as those by a conventional dip method.

(2) Single Layer Type

The liquid to be coated was prepared according to Table 3. The common conditions described above in connection with the laminate type were applied to this case.

Coating of the liquid was carried out at a liquid feed rate of 200 ml/min and at a workpiece transfer velocity of 55 mm/sec. The thickness of the dried coated film was estimated to be 20 μm. The measured value of the thickness was within the range of 20±0.6 m.

After coating with layer liquid, the electrical characteristcs were measured and the picturing characteristics were evaluated. The results were substantially the same as those by a conventional dip method.

TABLE 1

| Preparation of Charge Generating Layer Liquid | |
|---|---|
| Bis-azo compound described below | 10 parts |
| Phenoxy resin | 5 Parts |
| (PKHH manufactured by Union Carbide) | |
| Polyvinyl butyral | 5 parts |
| (BH-3 manufactured by Sekisui Kagaku Kogyo) | |
| 4-methoxy-4-methyl pentanon-2 | 1000 parts |

This materials shown in Table 1 was mixed and then subjected to a grinding and dispersing treatment by a sand grind mill.

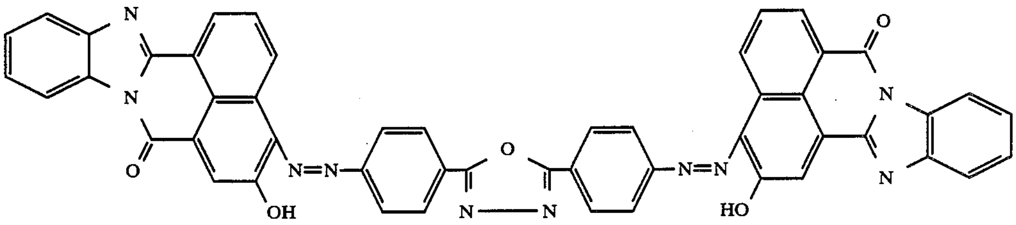

TABLE 2

| Preparation of Charge Transport Layer Liquid | |
|---|---|
| N-methyl carbazole-9-aldehyde diphenyl hydrazon | 90 parts |
| Polycaronate resin | 100 parts |
| Cyano compound described below | 4.5 parts |
| Cyclohexanone | 950 parts |

The materials in Table 2 were dissolved in a tank equipped with an agitator.

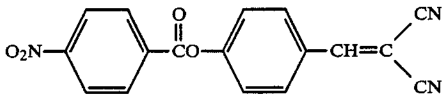

TABLE 3

| Preparation of Photosensitive Liquid for Single Layer | |
|---|---|
| Polycarbonate resin | 100 parts |
| Cyclohexanone | 1100 parts |
| Hydrazon of structural formula (1) described below | 80 parts |
| Electron attractive compound of structural formula (2) described below | 20 parts |
| Azo pigment of structural formula (3) described below | 10 parts |

The above-described four materials except the azo pigment were dissolved to form solution and then the azo pigment was added to the solution. Then, a treatment for uniform dispersion took place using a sand grind mill.

(1)

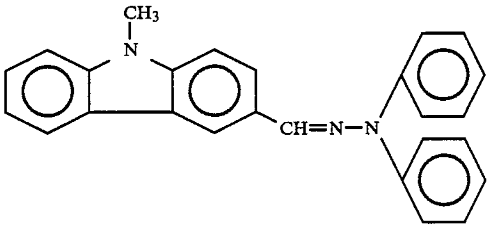

(2)

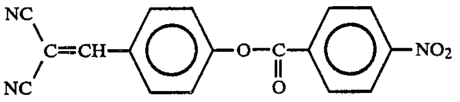

(3)

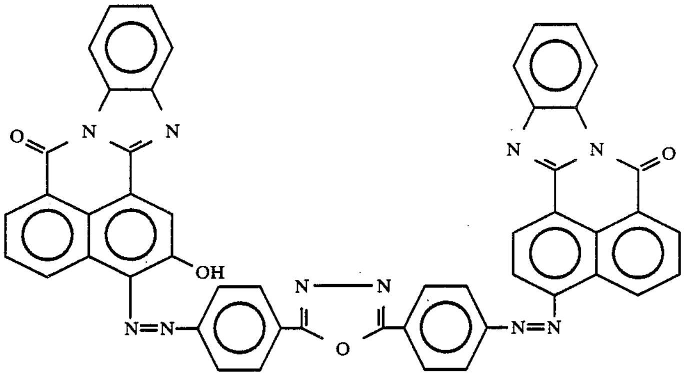

The present invention is not limited to the examples described above. For example, the present invention may be applied to jet washing. In this instance, in order to prevent the wash liquid flying away, a tunnel-like cover is arranged at the position where the workpiece is exposed to the jet of wash liquid. A nozzle is arranged on the inner surface of the upper wall of the tunnel so that it is close to the workpiece and recovery of the liquid is carried out through a nozzle opening into the inner surface of the lower wall of the tunnel.

The present invention is suitable for transferring a workpiece when electrostatic spray coating is carried out on a blank tube for an organic electrophotographic photoconductor (OPC) and prevents a nonuniform coating with the droplets due to sagging of the droplets and a variation in the potential gradient, resulting in the coated film having a uniform thickness. The shaft is constantly covered with the workpieces and the pusher is spaced from the location where coating takes place, thereby preventing adhesion of the coating liquid to the shaft and pusher, resulting in the operation being carried out stably and smoothly. Also, all workpieces are automatically transferred in succession at a constant speed for the coating, thereby accomplishing an increase in coating efficiency and a decrease in cost. Thus, the present invention has high industrial applicability.

We claim:

1. A method for transferring hollow cylinder-like workpieces while rotating and transferring the workpieces and avoiding contact with the outer surfaces of each workpiece, comprising the steps of:
- fitting flanges having holes at opposite axial ends of each workpiece;
- successively mounting a plurality of the flanged workpieces on one end of a horizontally extending shaft supported on at least four axially spaced rollers, said rollers being vertically reciprocable in groups such that said shaft is always supported by at least two axially spaced rollers;
- rotating said workpieces by rotating said shaft via said rollers;
- advancing the workpieces away froms said one end of the shaft and toward the other end of the shaft by pushing said workpieces with a pusher, wherein said workpieces about one another end-to-end;
- reciprocating said rolllers such that the workpieces being advanced by the pusher are not contacted by the rollers; and successively removing the workpieces from the shaft.

2. The method of claim 1 wherein said mounting step comprises pushing the workpieces on the shaft with a first pusher.

3. The method of claim 2 wherein said advancing step comprises pushing the workpieces at a constant speed with a second pusher.

4. The method of claim 3 wherein said removing step comprises pushign the workpieces with a third pusher.

5. The method of claim 4 wherein said first and third pushers move at a speed greater than said constant speed and the rollers are reciprocated such that they are not contacted by said second pusher.

6. A method for coating hollow cylinder-like workpieces while rotating and transferring the workpieces and avoiding contact with the outer surfaces of each workpiece, comprising the steps of:
- fitting flanges having holes at opposite axial ends of each workpiece;
- successively mounting a plurality of the flanged workpieces on one end of a horizontally extending shaft supported on at least four axially spaced rollers, said rollers being vertically reciprocable in groups such that said shaft is always supported by at least two axially spaced rollers;
- rotating said workpieces by rotating said shaft via said rollers;
- advancing the workpieces away from said one end of the shaft and toward the other end of the shaft by pushing said workpieces with a pusher, wherein said workpieces abut one another end-to-end;
- coating the rotating and advancing workpieces;
- reciprocating said rollers such that the workpieces being advanced by the pusher are not contacted by the rollers; and
- successively removing the workpieces from the shaft.

7. The method of claim 6 wherein said mounting step comprises pushing the workpieces on the shaft with a first pusher.

8. The method of claim 7 wherein said advancing step comprises pushing the workpieces at a constant speed with a second pusher.

9. The method of claim 8 wherein said removing step comprises pushing the workpieces with a third pusher.

10. The method of claim 9 wherein said first and third pushers move at a speed greater than said constant speed and the rollers are reciprocated such that they are not contacted by said second pusher.

* * * * *